Figure 1:
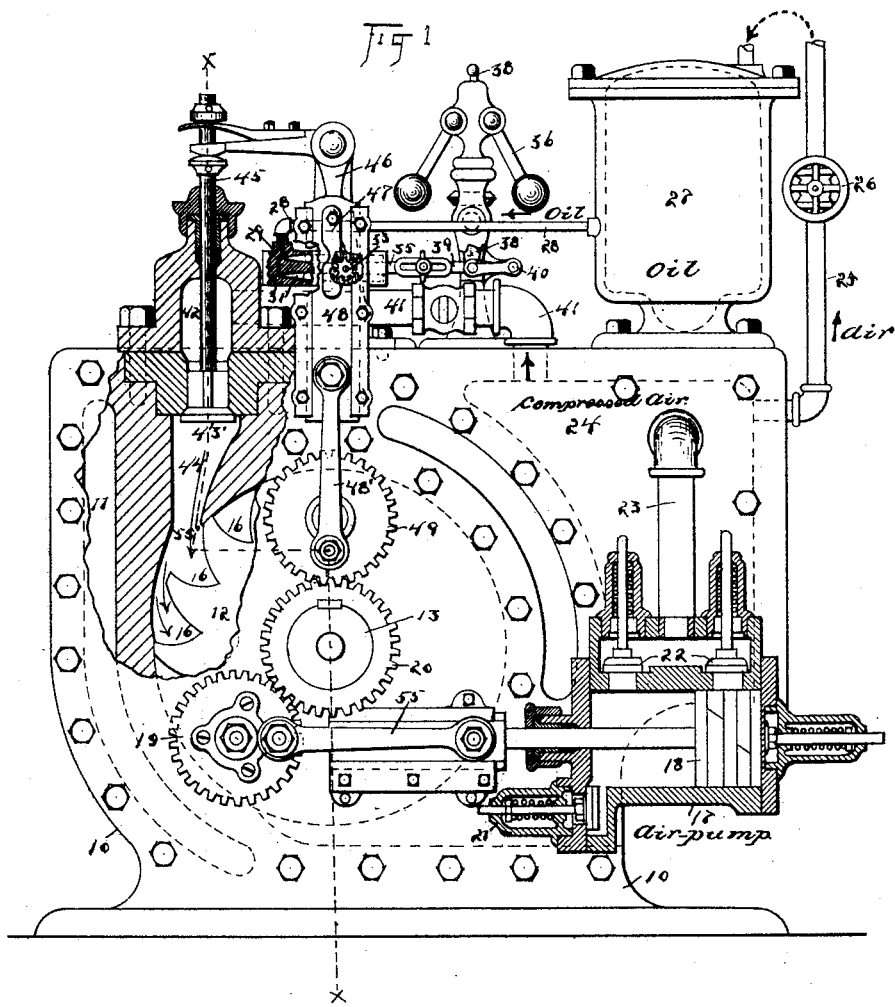

(No Model.) 5 Sheets—Sheet 1.

D. D. & J. T. HOBBS.
ROTARY GAS ENGINE.

No. 460,070. Patented Sept. 22, 1891.

Witnesses
R. B. Moser
N. L. McLane

Inventors.
David D. Hobbs
John T. Hobbs
By their Attorney
A. T. Fisher

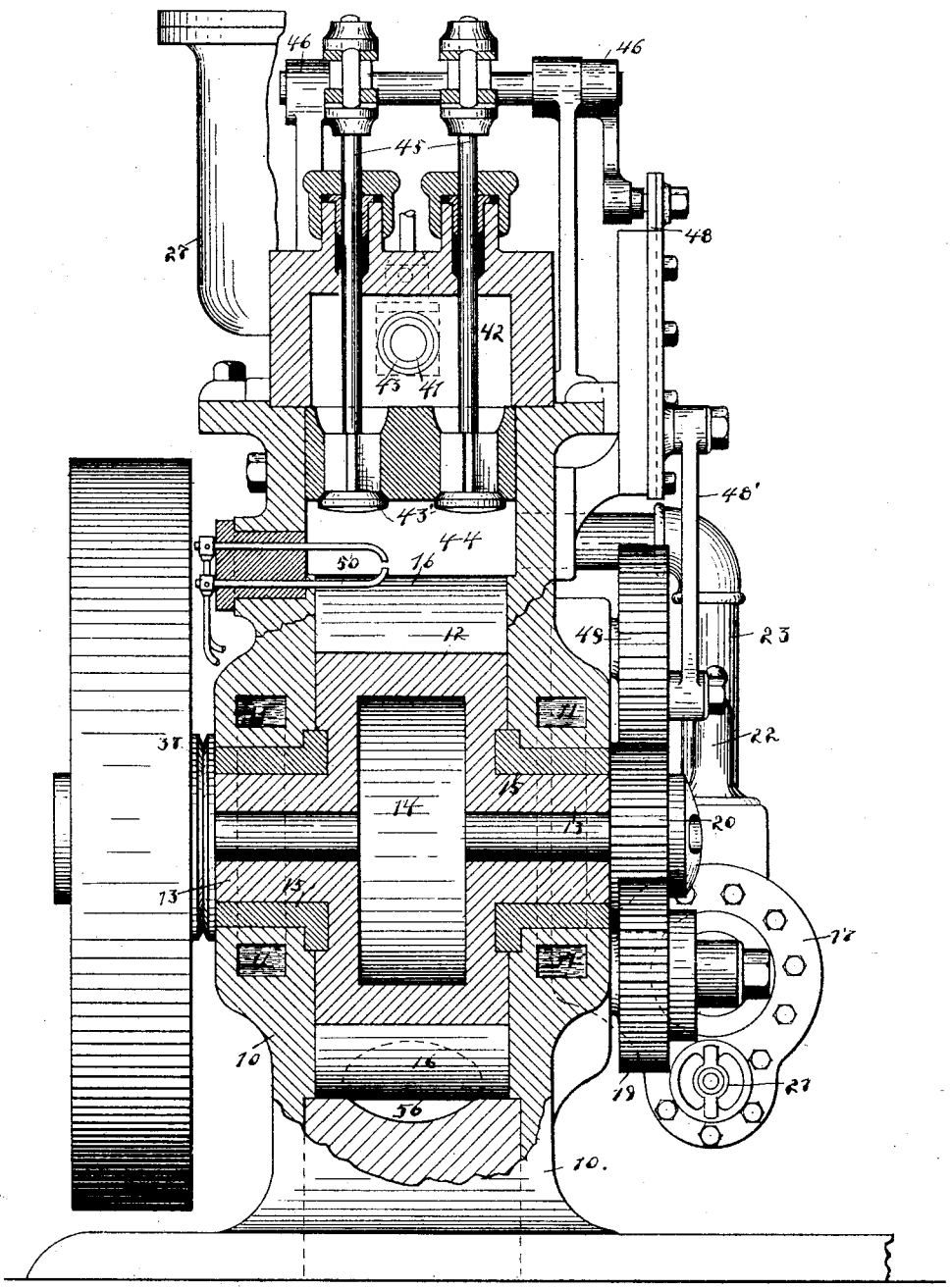

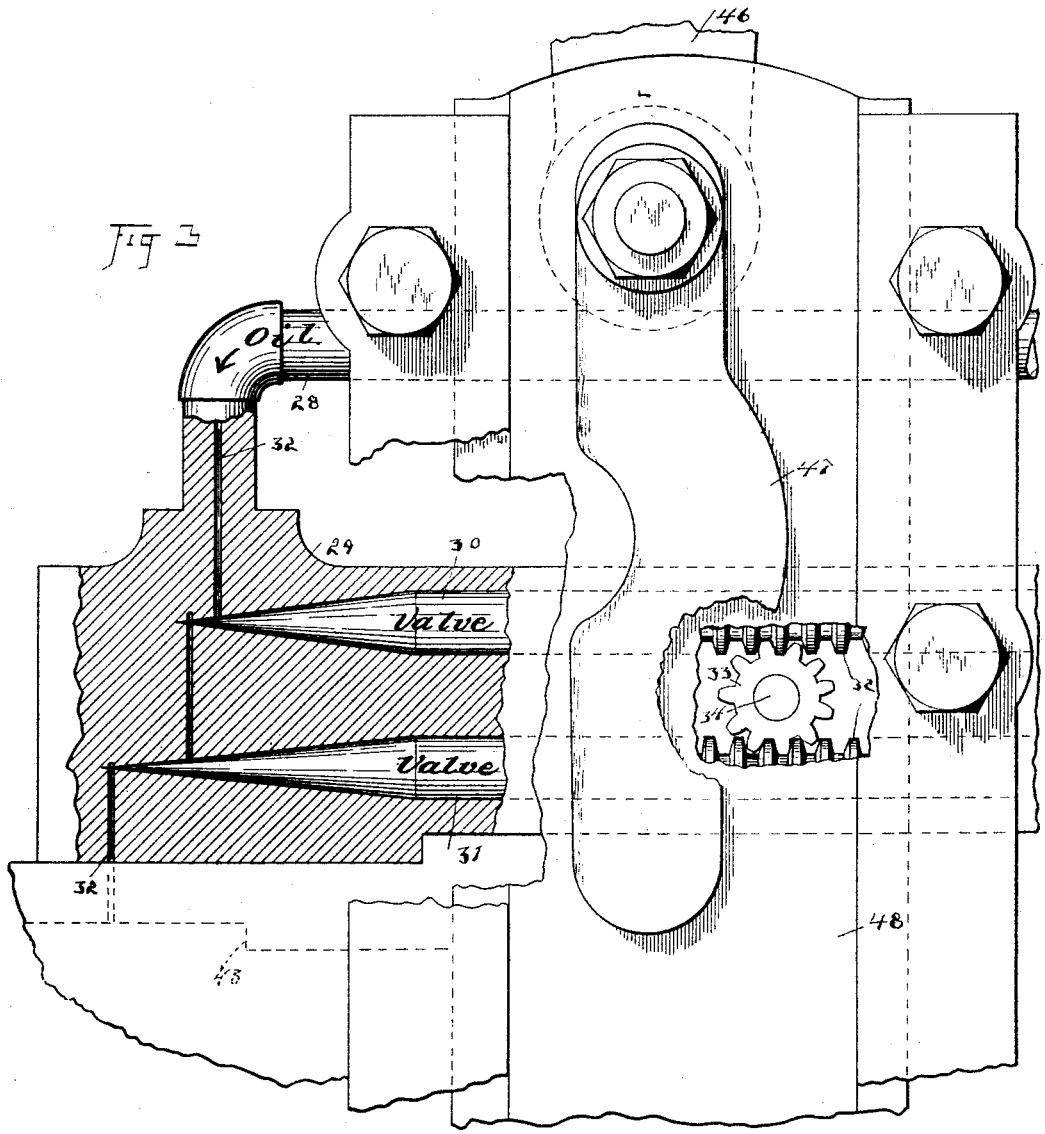

(No Model.) D. D. & J. T. HOBBS. 5 Sheets—Sheet 4.
ROTARY GAS ENGINE.
No. 460,070. Patented Sept. 22, 1891.
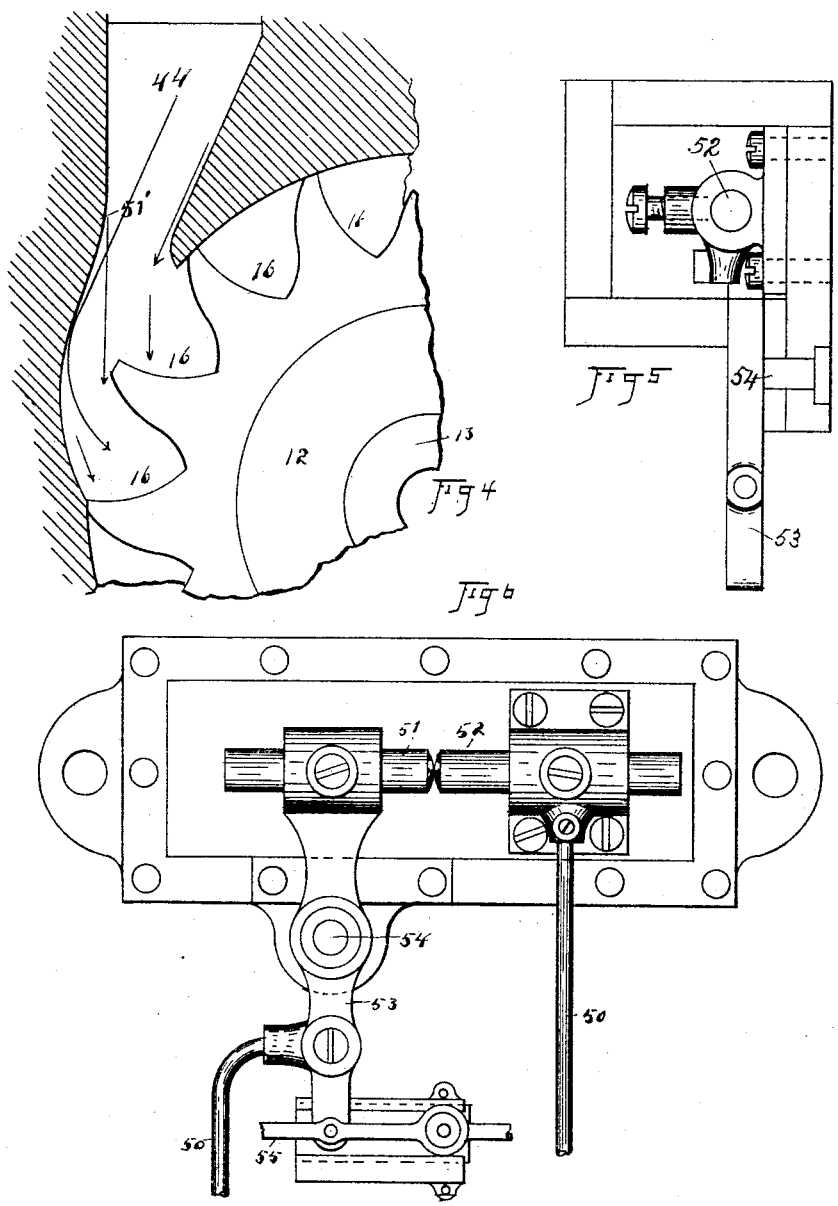

(No Model.) 5 Sheets—Sheet 5.
D. D. & J. T. HOBBS.
ROTARY GAS ENGINE.
No. 460,070. Patented Sept. 22, 1891.
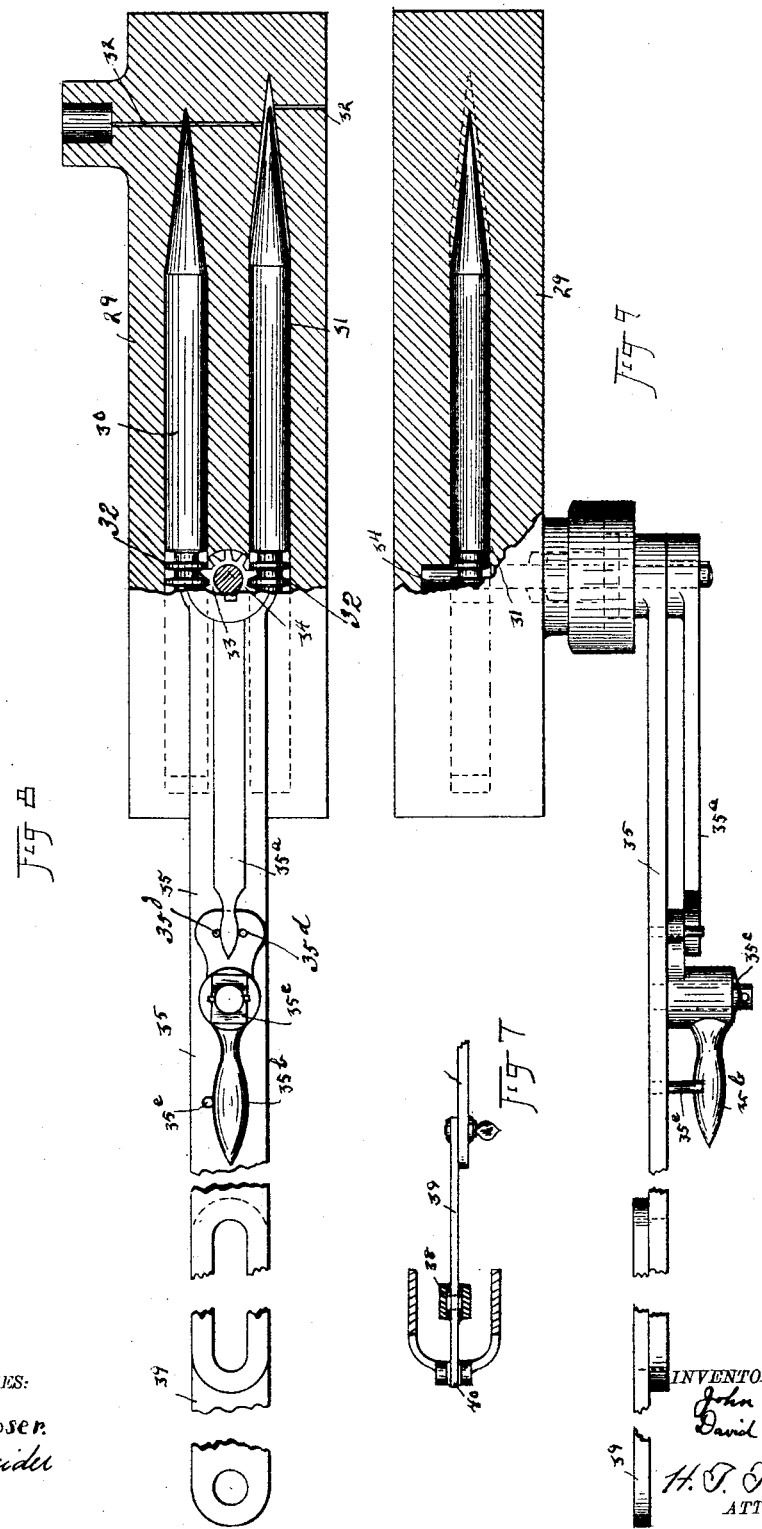
WITNESSES:
R. B. Moser
V. Schneider
INVENTORS.
John T. Hobbs
David D. Hobbs
H. T. Fisher
ATTORNEY.

UNITED STATES PATENT OFFICE.

DAVIS D. HOBBS AND JOHN T. HOBBS, OF CLEVELAND, OHIO, ASSIGNORS OF ONE-HALF TO A. N. MEADE, OF SAME PLACE.

ROTARY GAS-ENGINE.

SPECIFICATION forming part of Letters Patent No. 460,070, dated September 22, 1891.

Application filed November 6, 1890. Serial No. 370,493. (No model.)

*To all whom it may concern:*

Be it known that we, DAVIS D. HOBBS and JOHN T. HOBBS, citizens of the United States, residing at Cleveland, in the county of Cuyahoga and State of Ohio, have invented certain new and useful Improvements in Rotary Gas-Engines; and we do hereby declare that the following is a full, clear, and exact description of the invention, which will enable others skilled in the art to which it appertains to make and use the same.

Our invention relates to certain new and useful improvements in rotary gas-engines of the variety in which the gas is exploded and the resulting power operates to turn the piston, the piston being provided with pockets on its periphery to receive the effect of the explosions. Different kinds of gases may be employed—such, for example, as are derived from gasoline, naphtha, or other volatile hydrocarbons, or even natural gas in its natural state—the quality or variety of the gas not being material, provided that when mixed with atmospheric air and it is duly ignited it will produce the desired explosive force. We are aware that it is not broadly new to employ gas in this manner in connection with engines of different kinds, some of which have rotary pistons; but we are not aware that an engine has ever before been known or used possessing the distinguishing characteristics of construction embodied in our invention.

In the accompanying drawings, Figure 1 is a side elevation, partly in section, of our improved engine. Fig. 2 is a vertical transverse section substantially on line $x\,x$, Fig. 1, the said view being somewhat enlarged on Fig. 1 to more clearly disclose the construction and relation of the parts. Fig. 3 is an enlarged side elevation, partly in section, of the mechanism more immediately connected with the oil-controlling valves, and showing the needle-points of said valves and the oil-passages. Fig. 4 is an enlarged side sectional view of a section of the piston and the explosion-chamber, and showing especially the peculiar construction of the said chamber and the direction of the lines of force in respect to the piston resulting from such construction. Fig. 5 is an end view of electrical circuit making and breaking mechanism, of which Fig. 6 is a front elevation. Fig. 7 is a plan view of the mechanism connecting the governor and the oil-controlling valves. Fig. 8 is an elevation, partly in section, of the valves and valve mechanism; and Fig. 9 is a plan view thereof, partly in section, the upper valve being removed.

The engine disclosed in the several views comprises an air-pump and chamber from which suitable and equal atmospheric pressure is obtained in the oil-tank upon the oil and in the air-supply pipe at the point where air and oil are brought together and the oil vaporized, an explosion-chamber provided with an electrical ignitor, and a rotary piston driven by explosions in the said chamber. Referring now to these elements in detail, we have, first, the engine frame or casing 10, provided with water-jacket 11 about its sides to assist in keeping the engine cool, and the rotary circular piston 12, having integral therewith the trunnions 13, serving in this instance all the purposes of the usual shaft and extending laterally beyond the casing to afford supports for the wheels or gears secured thereon at the ends. To further contribute to the cooling of the engine, we make the said trunnions with axial openings leading into the interior chamber 14 of the piston. This chamber is made of such size that the piston proper is a mere shell, as it were, having just enough depth and thickness of material to give it the requisite strength, and yet leaving it thin enough to be affected by the water circulating therethrough and occupying the said chamber. The trunnions or shaft of the piston run in bronze or other suitable bearings 15, and the parts are so constructed and arranged that no packing of the piston is required. Upon the periphery of the piston is a continuous series of pockets 16, extending across the full width of the periphery and running close to the wall of the casing. These pockets are slightly concave in cross-section on their front surface, which receives the impact of the explosion, and slightly convex on their back; but this construction may be changed or varied without departing from the spirit of the invention.

Proceeding now to trace the air and the oil to the explosion-chamber, we have, first, the air-pump provided with a cylinder 17 and a piston 18, driven from a gear-wheel 19, meshing with a wheel 20 on the axle of the piston 12, suitable connections being made between wheel 19 and piston 18. The air-pump has inlet valve or valves 21 and outlet-valves 22, and a pipe 23 leads to an air-chamber 24. (Shown in dotted lines, Fig. 1.) A pipe 25, having a controlling-valve 26, leads from the said air-chamber to the oil tank or reservoir 27, discharging into the top thereof, so as to bring the air-pressure upon the oil. This tank may be located in any convenient place at any suitable elevation, but in this instance for convenience is shown as placed on the engine casing or frame. A discharge-pipe 28 leads from the said tank or reservoir to the valve-box 29, Fig. 3, which is provided with seats for the conical valves 30 and 31, arranged one above the other and entering the oil-channel 32 at different elevations. Preferably this oil-channel is arranged in a zigzag line, the openings for the valve-points forming the horizontal portion of the said channel. Both valves are designed to have a back-and-forth play, more or less, and to be more or less open, according as greater or less speed of the engine is desired or more or less power is required under varying loads to drive the engine. The shanks of the valves 30 and 31 have teeth 32, which are engaged by a pinion 33, secured rigidly to spindle 34, Fig. 8, by spline or otherwise. The operating-bar 35 is loosely attached to this spindle, so as to pivot thereon, and outside thereof is an arm 35$^a$, rigidly fixed to the spindle. This arm in turn is controlled by a lever 35$^b$, pivoted on the bar 35, on which it is held in close frictional contact by a spring 35$^c$, and at its opposite ends has pins 35$^d$, between which the end of lever 35$^a$ works. A stop 35$^e$ limits the movement of arm 35$^b$ upward. When the engine is to be started, the valves 30 31 are initially operated by the aforesaid arm and lever, so as to admit oil for the first explosion, and then the said parts are restored to position, as in Fig. 8, and thereafter the valves 30 31 are automatically controlled from the governor through the bar 35 and parts 35$^a$ and 35$^b$, which for this purpose operate as if they were rigid with bar 35. Having the two valves set, say, as shown and the upper valve, under the operation of the governor, plays back, the lower valve will play forward, and the two valves being sensitively seated and arranged and designed in any event to allow only a very small amount of oil to flow will automatically control said flow, as desired. Obviously if the pinion 33 is rotated to open valve 30 more or less it will at the same close valve 31 to the same extent. The two valves operate conjointly as a double check on the flow of the oil, and the lower one is set to be open when the upper one is closed. The governor 36 may be of any suitable kind and is run by a cord or belt from wheel 37 on the main shaft or axle of the engine, Fig. 2. To the vertically-movable shaft 38 of the governor is secured the link or bar 39 some distance forward of its fixed pivot-point 40, and this bar has a slot through which the overlapping end of link 35 is connected therewith by an adjusting-pivot. In case the belt runs off the lower valve closes at once, and for this reason is termed the "governing-valve." The oil passing these valves 30 and 31 enters the pipe 41, which opens at one end into the top of the main air-chamber 24 and at the other into the gas-chamber 42, and as the air in this pipe is under pressure—say two and a half or three atmospheres, more or less—it follows that any oil entering said pipe in the quantity allowed by the valve mechanism is instantly volatilized or vaporized, and the resulting vapor of course mingles with the air, and an explosive compound is thus formed. The said pipe 41 at its outer extremity is purposely reamed out or formed with a shoulder or other suitable obstruction at 43 to prevent oil that may gather therein from running back into the air-chamber. However, there is no real danger that such overflow would occur even without this precaution. Different admixtures of air and oil vapor as to quantity of each may be employed; but I prefer to use the proportion of about twelve of vapor or oil to one of air.

Manifestly as the percentage of air is increased the mixture is made more difficult to explode, and as we prefer to run with a minimum of oil and a maximum of air we must provide for the production of explosions under conditions that are the most difficult and which require much more than ordinary electric sparking or its equivalent in a flame from the outside. Provision is made for such explosions, as hereinafter explained.

A supply of gas being provided in the chamber 42, we employ one or more valves 43' at the bottom of said chamber to regulate the flow of gas to the explosion-chamber 44. These valves fit tightly upon their seats, and the chamber is constructed with such strength at all points as to withstand the shock or strain of the explosions. The stems 45 of the said valves 43 extend up through the gas-chamber and are controlled by bell-crank levers 46, pivoted on suitable supports, the horizontal arms of the said levers 46 connecting with said stems, and the vertical arms having anti-friction rollers working in the serpentine slot 47 of the reciprocating slide 48. This slide is held in guides at its sides, and a connecting-rod 48', fixed eccentrically on gear-wheel 49, meshing with gear 20 on the main axle, serves to vibrate the bell-crank lever 46, and thus open and close the valves 43' at the proper times. In practical operation the said valves are open only momentarily—say while as many as three of the pockets 16 in the periphery of the piston are in turn exposed at any given point beneath the explosion-chamber—and during such opening a sufficient volume of gas for any one explosion is admitted. This accomplished, the valves quickly close and the gas is ready to be ignited. For this purpose we preferably employ an electric current, although the invention is not necessarily limited to the use of electricity. In Fig. 2 we show suitably-arranged wires 50, extending into the explosion-chamber, and these are connected up with the contact making and breaking device seen in Figs. 5 and 6. This device preferably has carbon points 51 and 52, held adjustably in their bearings, the point 52 being in a fixed bearing and the point 51 in an oscillating arm 53, pivoted at 54 and connected at its lower end to any suitable moving part of the engine—as, for example, the connecting-rod 53, Fig. 1, of the pump. The movements of the carbon points will of course be timed with respect to the movements of the valves 43′, so that they will cause the requisite electric flash in the explosion-chamber when the said valves have passed the necessary amount of gas and are closed, and these movements respectively will be continued in like manner at all times and always follow one another in succession. Any arrangement of mechanism that will produce these results in the manner required may be adopted in lieu of that shown and be within the terms of the invention; but, owing to the large volume of atmospheric air contained in the gas, explosion is difficult to produce, and for this reason an unusually heavy current of electricity is required, and much more than is ordinarily employed to light a common jet of illuminating-gas. Hence either a suitably-large battery or other generator must be used to furnish the current. Supposing, now, that a flash has been passed and an explosion produced, special attention is called to the peculiarity of the construction of the explosion-chamber, by which the force of the explosion is most effectually delivered to the piston. It will be seen that the said chamber is largest at the top and that it converges in practically straight lines to the neck or contracted portion 55′, which is just outside the radius or periphery of the piston. This novel construction has the advantage of centering and intensifying the force of the explosion exactly where it will be most effective and then to further economize and utilize the power the shell of the casing is formed with a slight concavity beginning at the said neck and extending some distance till it curves into the periphery of the piston at a point about horizontally opposite its axis. Thus the lines of force that initially are diverted from the piston and would be dissipated are brought back without material loss to a position where they strike the piston at the greatest possible advantage, and in this manner are caused to contribute their due proportion to the propelling force of the explosion. It will also be noticed that if the concavity in the casing which gives these deflecting-lines were not employed, and instead a straight continuous line were used, the explosion might be almost wholly expended in a single cavity or pocket of the piston and that at a most disadvantageous angle, while with the concavity we are assured an impact of the force on at least two different exposed surfaces and with the greatest advantage both to the piston and the propelling power.

The exhaust or outlet from the main cylinder is shown at 56, Fig. 2.

The operation of the engine will be understood from the foregoing description and need not be separately set forth. An engine thus constructed is adapted to very high speed and may be built of any desired size.

It will be observed that the pockets in the periphery of the piston are substantially in the shape of an isosceles triangle, in which the back and outer edge represent the longer sides and the face 16 the shorter side. It will also be observed that by this construction of the pockets and by arranging the explosion-chamber with its direct lines of force at right angles to the axis of the piston the back of the pocket forms a wall substantially in line with the lines of force and with the wall of the explosion-chamber when the pocket reaches the discharge-point of said chamber, so that thereby the explosive force is caused to be expended on the face of the pocket, where it strikes the piston with the greatest possible advantage. The peculiar construction of the explosion-chamber likewise adds greatly to the efficiency of the engine. It will be seen that this chamber gradually diminishes in size to its point of discharge, which is immediately at the periphery of the piston. The chamber tapers clear to its extremity or neck, so that the force of the explosion is thus concentrated and driven through upon the piston without diminution, as would occur if a long neck were employed instead. The inner side of the explosion-chamber is inclined outwardly from top to bottom, so as to direct the lines of force as near to the periphery as practicable and where the impact will be farthest from the axis, so as to insure the highest possible efficiency. Its line is substantially with the periphery of the piston.

Having thus described our invention, what we claim as new, and desire to secure by Letters Patent, is—

1. In a gas-engine, a rotary piston having pockets limited to its periphery, and an explosion-chamber gradually tapered to its point of discharge immediately at the periphery of the piston and over the face of said pockets, the said chamber constructed and arranged to direct the lines of force at right angles to the axis of the piston, substantially as described.

2. In a gas-engine, a rotary piston having pockets in its periphery substantially triangular in outline, in combination with an explosion-chamber having its sides contracted to a narrow neck at the periphery of the piston, and the side of the chamber nearest to the piston inclined outwardly therefrom to the point of discharge, whereby the lines of force are thrown toward the periphery of the piston, substantially as described.

3. In a rotary engine, the main casing having an explosion-chamber with sides converging gradually to the lower extremity thereof immediately at the periphery of the piston, the inner side of said chamber inclining away from the piston and substantially in line with the periphery thereof, and a cavity in the said casing below the mouth of the explosion-chamber terminating at the edge of the piston, in combination with a piston having a series of pockets in its periphery provided with faces at right angles to the lines of explosive force, and rear walls substantially at right angles to said faces and terminating at the periphery of the piston, substantially as described.

4. The main casing having an explosion-chamber tapered gradually inward from its top toward its lower end to form a contracted opening, through which the force of the explosion is delivered to the piston, and having its inner side cut partly away in a curved line beneath said neck, whereby the explosive force is distributed to two or more pockets on the piston, in combination with the piston having pockets on its periphery deepest at their center from front to rear on the side receiving the impact, substantially as described.

5. The main casing having an explosion-chamber opening downward and a rotary piston with pockets into which said chamber discharges, in combination with a valve in said chamber closing the opening thereto, a gas-supply chamber outside said valve, said valve having a rod extending through said gas-supply chamber, a lever for operating said rod and valve, and mechanism connecting said lever with the drive mechanism of the engine, whereby the said valve is opened and closed mechanically, substantially as described.

6. In the rotary gas-engine herein described, the air and gas commingling chamber and the double set of needle-valves to control the flow of oil to said chamber, said valves having teeth on their stems, a pinion set between both stems and engaging the teeth thereon, and a governor connected with said pinion and turning the same, substantially as described.

7. The main casing having an explosion-chamber and a rotary piston in said chamber, a compressed-air chamber and a separate piston actuated from said rotary piston to force the air into said chamber, an air and gas commingling chamber, and a valve in the explosion-chamber to control the flow of commingled air and gas thereto, substantially as described.

Witness our hands to the foregoing specification this 29th day of October, 1890.

DAVIS D. HOBBS.
JOHN T. HOBBS.

Witnesses:
H. T. FISHER,
NELLIE L. McLANE.